(12) United States Patent
Uusitalo et al.

(10) Patent No.: US 9,353,849 B2
(45) Date of Patent: May 31, 2016

(54) METHOD AND ARRANGEMENT FOR CONTROLLING THE LUBRICATION OF A GEAR SYSTEM

(71) Applicant: MOVENTAS GEARS OY, Jyväskylä (FI)

(72) Inventors: Kari Uusitalo, Jyväskylä (FI); Jukka Elfström, Jyväskylä (FI)

(73) Assignee: MOVENTAS GEARS OY, Jyvaskyla (FI)

( * ) Notice: Subject to any disclaimer, the term of this patent is extended or adjusted under 35 U.S.C. 154(b) by 290 days.

(21) Appl. No.: 13/623,931

(22) Filed: Sep. 21, 2012

(65) Prior Publication Data

US 2013/0074628 A1    Mar. 28, 2013

(30) Foreign Application Priority Data

Sep. 22, 2011   (EP) ..................................... 11182316

(51) Int. Cl.
*F16H 57/04*    (2010.01)
*F16N 1/00*     (2006.01)

(52) U.S. Cl.
CPC ....... *F16H 57/0435* (2013.01); *Y10T 74/19991* (2015.01)

(58) Field of Classification Search
CPC .................................................. F16H 57/0435
USPC ............... 184/4, 6.12, 6.22; 416/170 R, 174; 323/283
See application file for complete search history.

(56) References Cited

U.S. PATENT DOCUMENTS

| | | | |
|---|---|---|---|
| 4,095,165 A * | 6/1978 | Boros ........................... 323/283 |
| 6,941,922 B2 * | 9/2005 | Williams ................. F01M 1/02 123/196 R |
| 7,506,724 B2 * | 3/2009 | Delaloye ................. F01D 25/18 137/38 |
| 2003/0059310 A1 | 3/2003 | Koenig et al. |
| 2009/0191060 A1* | 7/2009 | Bagepalli et al. ............. 416/174 |

(Continued)

FOREIGN PATENT DOCUMENTS

| | | |
|---|---|---|
| CN | 101512143 A | 8/2009 |
| DE | 10 2007 029 469 A1 | 1/2009 |

(Continued)

OTHER PUBLICATIONS

Search Report issued in corresponding Chinese Application No. 201210449189.3 on Sep. 21, 2012 (in English).

*Primary Examiner* — William E Dondero
*Assistant Examiner* — Robert T Reese
(74) *Attorney, Agent, or Firm* — Birch, Stewart, Kolasch & Birch, LLP

(57) ABSTRACT

A gear lubrication arrangement comprises a lubrication pump for circulating lubrication fluid. A power source coupled to the lubrication pump drives the lubrication pump, and a controller controls an output power of the lubrication pump. The gear lubrication arrangement comprises a pressure sensor disposed down-stream of the lubrication pump The pressure sensor is configured to measure a pressure of the lubrication fluid and to produce a pressure indication signal representative thereof. The controller is arranged to vary the output power of the lubrication pump at least partly on the basis of the pressure indication signal.

18 Claims, 2 Drawing Sheets

(56) References Cited

U.S. PATENT DOCUMENTS

| | | |
|---|---|---|
| 2010/0130327 A1 | 5/2010 | Morgan, Jr. |
| 2010/0187043 A1 | 7/2010 | Murahashi et al. |
| 2011/0168495 A1* | 7/2011 | Subramaniam et al. ..... 184/6.12 |
| 2011/0188988 A1 | 8/2011 | Wadehn |
| 2011/0217173 A1* | 9/2011 | Mallada et al. ........... 416/170 R |
| 2012/0241258 A1* | 9/2012 | Subramaniam et al. ....... 184/6.4 |

FOREIGN PATENT DOCUMENTS

| | | |
|---|---|---|
| DE | 102007029469 A1 | 1/2009 |
| EP | 2184487 A1 | 5/2010 |
| EP | 2 652 322 A2 | 6/2012 |
| WO | 2008/039119 A1 | 4/2008 |
| WO | 2012/079585 A2 | 6/2012 |

\* cited by examiner

METHOD AND ARRANGEMENT FOR CONTROLLING THE LUBRICATION OF A GEAR SYSTEM

TECHNICAL FIELD

The invention concerns in general the technology of providing lubrication to a mechanical gear. Especially the invention concerns the technology of ensuring proper lubrication under a wide variety of conditions, over which an operator responsible for correct operation of the gear may have little or no influence.

BACKGROUND OF THE INVENTION

In this description we use the term gearwheel to refer to a cogged, rotating machine part. Two or more meshing gearwheels constitute a gear stage. The term gear as such refers in this description to a mechanical system having a first shaft and a second shaft, between which one or more gear stages provide speed and torque conversions and/or a change in a direction of a rotational axis. A gear unit comprises a gear proper and may comprise auxiliary augmenting systems, such as instrumentation, control, and lubrication arrangements.

The gear unit of a wind turbine plays an important part in transmitting the power and the rotation energy of the rotor blades to the generator, which creates electric energy. Ensuring the smooth and reliable operation of the gear is vital to achieving proper performance of the wind turbine. As such, gears are encountered also at numerous other applications, but the specific characteristics and demanding environmental conditions that concern a wind turbine mean that their design often calls for highly developed special solutions.

In a wind turbine the first shaft of the gear is coupled to the rotor assembly and the second shaft is coupled to the generator. Within the gear, at least one gear stage is located between the first and second shafts for transmitting the rotational movement and for implementing the desired speed and torque ratios between the shafts. Bearings are used to support the shafts and the gearwheels with as little friction as possible.

The gear stage(s) and the bearings need lubrication, for which purpose the gear unit typically comprises a lubrication pump configured to circulate lubrication fluid through the gear stages and bearings. In very simple implementations a rotational movement of some part of the gear is used to drive the lubrication pump. Concerning a wind turbine, which may stand still for lengthy periods, such an axis driven lubrication pump would cause a delay at startup before a sufficient amount of lubrication fluid could reach the critical moving parts, and is thus not to be recommended.

A more versatile solution involves using a dedicated power source, such as an electric or hydraulic motor, to drive the lubrication pump. As a part of a controlled startup the power source may be switched on before the gearwheels start moving, so that they receive the appropriate amount of lubrication fluid already from the beginning. Knowing when to switch on the power source obviously necessitates the gear unit to comprise, or to benefit from the operation of, a control unit that is capable of controlling the operation of large parts of the wind turbine.

However, even in such cases finding the proper lubrication method is not straightforward. As an example, temperatures ranging from −40 to over +85 degrees centigrade may occur within the gear, with significant effects on the viscosity of the lubrication fluid. Changes in viscosity affect the way in which the lubrication fluid flows through the lubrication channels, and also its capability of maintaining the lubricating film between metal parts moving in relation to each other.

SUMMARY OF THE INVENTION

An objective of the present invention is to provide a method and an arrangement for controlling the lubrication of a gear in an effective and advantageous way. Another objective of the present invention is to ensure that control of the lubrication can be achieved with reasonable investment in machinery and instrumentation. A further objective of the invention is to ensure that lubrication control can be easily integrated with other control functionalities of a gear unit. Yet another objective of the invention is to enable easily scaling the lubrication control method to gears of various dimensions.

These and other advantageous objectives of the invention are achieved by placing a lubrication fluid pressure sensor downstream of the lubrication pump and by using the measured pressure at least partly to vary the output power of the lubrication pump.

A gear lubrication arrangement according to the invention is characterised by the features recited in the characterising part of the independent claim directed to such an arrangement.

A method according to the invention is characterised by the features recited in the characterising part of the independent claim directed to a method.

Operating a lubrication pump causes primarily the pressure of the lubrication fluid to increase at the output of the pump. If conditions remain the same, an equilibrium state is soon reached where the increasing pressure is balanced by the flow resistance that the lubrication fluid meets on its way through the lubrication channels downstream of the lubrication pump, resulting in a steady output flow from the lubrication pump. Under steady state conditions a pressure reading obtained at a fixed location downstream of the lubrication pump stays the same.

The viscosity of typical lubrication fluids is inversely proportional to their temperature. An increasing internal temperature of the gear, where the lubrication fluid comes into contact with the moving mechanical parts, causes the lubrication fluid to warm up. Consequently the viscosity of the lubrication fluid decreases, and the capability of the lubrication fluid to maintain a lubricating film between contacting metal parts gets weaker. Also the flow resistance observed in the lubrication channels decreases. The latter would tend to lower the pressure reading, unless there is feedback from the pressure measurement to the controlled output power of the lubrication pump.

The same is true regardless of what was the reason for the change in viscosity: appropriate feedback from the pressure measurement will cause the output power of the lubrication pump to compensate for the pressure change. For example if ageing and/or the introduction of impurities cause the viscosity of the lubrication fluid to change, the resulting change in its lubricating capability will be at least partly counteracted by the lubrication pump changing its output power in an attempt to maintain the measured pressure at a desired value.

An observed output power of a pressure-controlled lubrication pump (or an observed control signal given to the lubrication pump as a result of using pressure feedback) can even be used as an indicator of the condition of the lubrication system. For example, if a number of other measured characteristics of the gear unit have remained the same but the output power of the lubrication pump has noticeably changed, this might indicate a problem with the lubrication fluid or a blockage or damage in the lubrication channels. A noticeable increase in the selected output power for the lubrication pump without a resulting increase in measured pressure might also indicate a problem in the lubrication pump or its power source.

Some additional information can be used to augment the measured pressure reading in controlling the lubrication pump. For example if a temperature measurement shows that the lubrication fluid is extremely cold (and thus sluggish), even a relatively high output power of the lubrication pump may result in a surprisingly low pressure reading, because the lubrication fluid experiences exceptionally high flow resistance between the pump output and the measurement point. In order to keep the lubrication pump from unnecessarily struggling against the highly viscous lubrication fluid, the output power of the lubrication pump is controlled with a control algorithm that takes into account the measured pressure of the lubrication fluid downstream of the lubrication pump and also a measured temperature.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF EMBODIMENTS OF THE INVENTION

Figure 1:
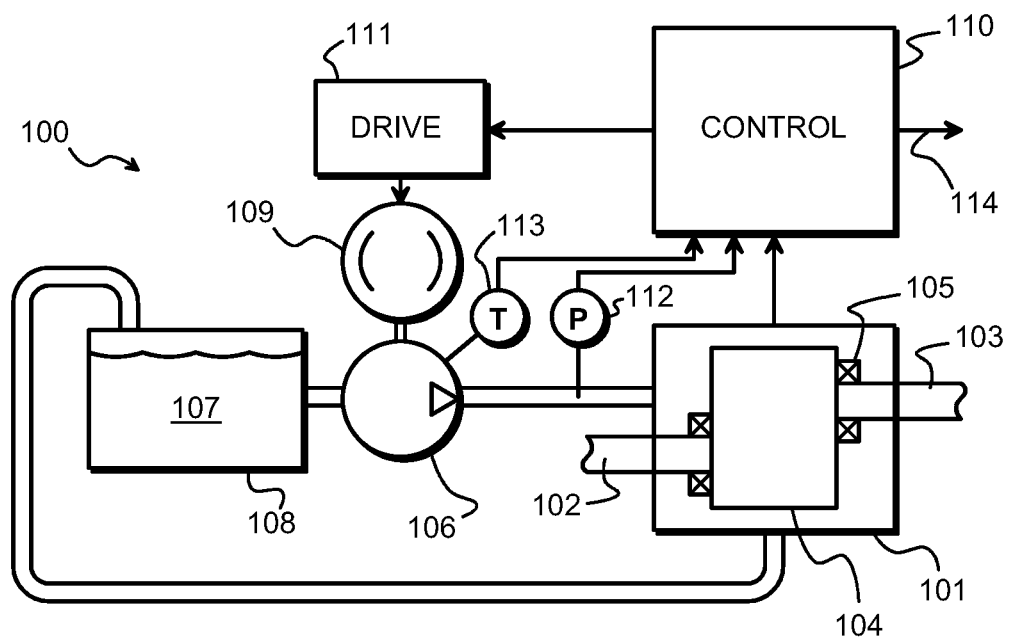
FIG. 1 illustrates schematically some parts of a gear unit.

FIG. 1 is a schematic illustration of certain parts of a gear unit 100, such as a gear unit for a wind turbine. A gear 101 comprises a first shaft 102 and a second shaft 103 for connecting to an external mechanical system, such as a rotor and a generator respectively. Within the gear 101 at least one gear stage 104 is located between the first and second shafts 102 and 103. The shafts are supported with bearings, of which bearing 105 is shown as an example.

In addition to the gear proper the gear unit comprises a gear lubrication arrangement. A part of the gear lubrication arrangement is a lubrication pump 106 for circulating lubrication fluid, such as lubrication oil 107 that is schematically shown to come from an oil sump or reservoir 108. The use of a reservoir is specific to so-called dry sump solutions, in which there is no large-capacity oil sump directly underneath the lubricated machine parts. The present invention has been designed specifically for dry sump gears, but it can be applied also in association with wet sump solutions.

A power source 109 is coupled to the lubrication pump 106 for driving it. For the purposes of easy and flexible control, an electric motor is often selected as the power source 109, but it can be also e.g. a hydraulic motor, a back and forth moving actuator, or any other power source that is capable of making the lubrication pump 106 pump lubrication fluid at different output powers.

The operation of the power source 109 is in turn controlled by a controller. In this description we use the term "controller" to refer in general to an entity that is capable of actively making the power source 109 drive the lubrication pump 106 in a desired manner, so that the latter pumps lubrication fluid at a desired output power. In short it may be said that it is the controller that eventually controls the output power of the lubrication pump, because the essential intelligence of the control arrangement resides in the controller. The controller is coupled to the lubrication pump and/or the power source. The nature and purpose of such coupling is described in more detail below.

In the exemplary embodiment of FIG. 1 the controller comprises a control unit 110 and a drive unit 111. Of these, the drive unit 111 is configured to deliver operating power to the power source 109 in appropriate quantities, so that as a result the power source 109 in turn drives the lubrication pump 106, making it deliver the desired output power. If the power source 109 is an electric motor, the drive unit 111 may be for example a variable frequency drive.

The control unit 110 is configured to give the drive unit 111 the control commands that regulate the delivery of operating power to the power source 109. For example a variable frequency drive may receive its control commands in the form of analog voltage levels or digital control words from the control unit 110.

Forming the control commands is at least partly based on feedback information that the controller (here: the control unit 110) obtains from the lubrication arrangement. In particular, the gear lubrication arrangement of FIG. 1 comprises a pressure sensor 112 that is disposed downstream of the lubrication pump 106 in respect of the lubrication fluid pumped by the lubrication pump. The pressure sensor 112 is configured to measure the pressure of the lubrication fluid and to produce a pressure indication signal representative thereof. A coupling from the pressure sensor 112 to the controller (here: to the control unit 110) provides for delivery of the pressure indication signal to the controller, so the last-mentioned is constantly aware of the pressure of the lubrication fluid at the point where the pressure sensor 112 is located. According to an embodiment of the invention, the controller is arranged to vary the output power of the lubrication pump 106 at least partly on the basis of the pressure indication signal it receives from the pressure sensor 112.

The actual physical implementation of the pressure sensor 112 is not essential to the invention. Pressure sensors suitable for measuring the pressure of lubrication fluids are known from the prior art of pressure measuring. The exact location of the pressure sensor 112 is also not of primary importance to the present invention, as long as it is downstream of the lubrication pump 106 and upstream of a point where the lubrication fluid will be dispensed in essentially free space over moving machine parts. Typically the pressure sensor 112 should be located within a channel that as a result of the operation of the lubrication pump 106 remains completely filled with moving lubrication fluid. One, two, or more pressure sensors can be used. If there are two or more pressure sensors, deriving the pressure indication signal may include arithmetic operations like calculating a mean value or difference, or taking into account pressure readings from different parts of the system in different ways.

According to an embodiment of the invention the operation of the controller, i.e. its arrangement to vary the output power of the lubrication pump 106, aims at driving the measured pressure of the lubrication fluid towards some predetermined target pressure. In other words, there is some predetermined pressure value for the lubrication fluid downstream of the lubrication pump 106 that the controller aims at maintaining.

The rationale behind such an aim is the insight that if lubrication fluid is pumped with an output power that produces a given pressure in a channel system having a fixed net cross section, the channel system will deliver the lubrication fluid to the gears and bearings that are to be lubricated in sufficient quantities that ensure proper forming of a lubricating film between moving parts. Dynamic changes in the viscosity of the lubrication fluid (for example as a result of its changing temperature) are taken into account automatically, because a fluid of lower viscosity will experience a lower flow resistance. Consequently it will tend to produce a lower pressure within the channels, so the pressure feedback will cause an increase in the output power of the lubrication pump. Thus the decreasing capacity of the lower-viscosity fluid of maintaining the lubricating film will be compensated for by increasing the amount per unit time of the lubrication fluid that will be delivered to the moving parts.

Figure 2:
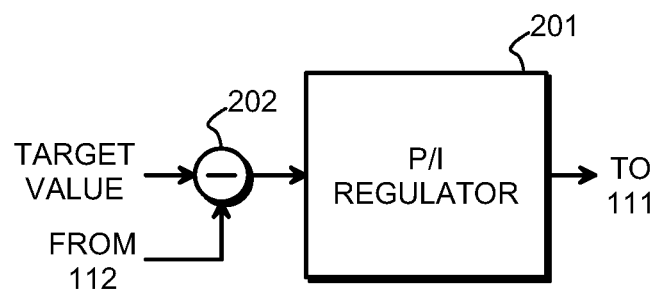
FIG. 2 illustrates an exemplary use of a P/I regulator.

An advantageous implementation of the control unit 110 comprises a proportional and integrative (P/I) regulator 201, as shown in FIG. 2. A difference between the pressure indication signal obtained from the pressure sensor 112 and a target pressure value read from a memory is calculated in a difference calculator 202, and said difference represents an input quantity of the proportional and integrative regulator 201. The use of a proportional and integrative regulator is one way of implementing a control function that reacts dynamically to and takes into account the magnitude of the difference between measurement and target, and also some history of how the difference has evolved lately.

Figure 3:
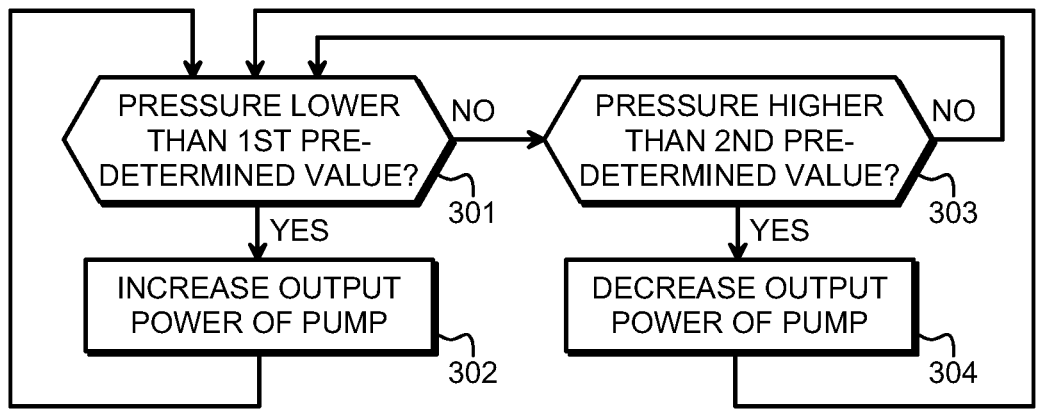
FIG. 3 illustrates a method aspect of an embodiment of the invention.

FIG. 3 is a schematic diagram of a simple, exemplary control method implemented by the controller to compensate for changes in the measured pressure of the lubrication fluid. Above it was pointed out that the controller receives constantly (or regularly) a pressure indication signal from the pressure sensor 112. At step 301 the controller examines, whether the measured pressure is lower than a first predetermined value, which could be characterised as the lower limit of allowable pressure. As a response to the measured pressure being lower than the first predetermined value, the controller increases the output power of the lubrication pump at step 302. If the pressure was not lower than the first predetermined value, the controller proceeds to examine at step 303, whether it is higher than an upper limit that is called here the second predetermined value. As a response to the measured pressure being higher than the second predetermined value, the controller decreases the output power of the lubrication pump at step 304. If neither the lower nor the upper limit was exceeded, the controller just returns from step 303 directly to step 301.

Depending on how sophisticated control is aimed at and e.g. what are the control possibilities allowed by the structure and operation of the drive 111 and the power source 109, either stepwise or continuous control of the output power of the lubrication pump 106 can be implemented. Stepwise control means that the controller is arranged to select the output power of the lubrication pump from a set of at least three discrete values. Continuous control means that the controller is arranged to vary the output power of the lubrication pump continuously. Digital control is actually inherently stepwise in all cases because of the discrete nature of the number space made up by the possible control words. However, for practical purposes it is customary to reserve the term stepwise control only to cases where the difference in output power resulting from the use of adjacent control commands is large enough to be clearly distinguished from e.g. fluctuations caused by uncontrolled sources such as friction.

Figure 4:
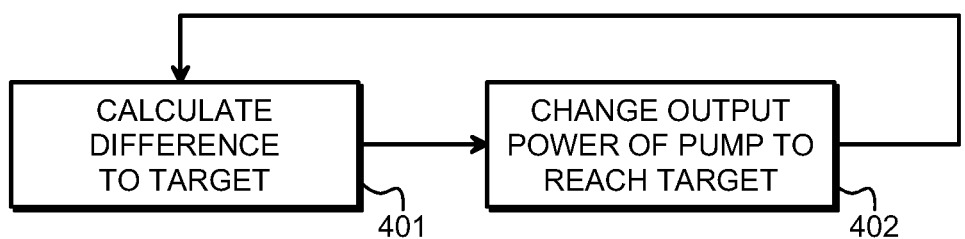
FIG. 4 illustrates a method aspect of another embodiment of the invention.

FIG. 4 illustrates an example of a simple continuous control method, comprising only two distinct steps. At step 401 the difference between a pressure indication signal and a target value is calculated, and at step 402 the output power of the lubrication pump is changed in order to make the pressure indication signal approach the target value.

The exemplary arrangement of FIG. 1, where the controller comprises the control unit 110 and the drive unit 111 as (at least logically) separate entities, is typical to solutions where the control unit 110 is responsible for also other kinds of control functions than just the pressure feedback. It is possible to build the functions of a control unit and a drive unit into an integral structure, which takes the pressure indication signal (or some straightforward derivative thereof) as an input signal and delivers operating power to the power source in appropriate quantities at its output. Advanced variable frequency converter drives are known that comprise some degree of programmability. They can be programmed so that they compare an input (such as a pressure indication signal) to a preprogrammed target value, or perform some other logical operations, that result in driving an electric motor with a predetermined relationship to said input.

The gear lubrication arrangement of FIG. 1 comprises also a temperature sensor 113. It is configured to measure a temperature of the lubrication fluid pumped by the lubrication pump 106. The temperature sensor 113 is configured to produce a temperature indication signal that represents the measured temperature of the lubrication fluid. A coupling from the temperature sensor 113 to the control unit 110 enables the control unit to take into account also the temperature of the lubrication fluid in determining, together with the drive unit 111, the appropriate output power of the lubrication pump. We may say that the controller that in FIG. 1 comprises the control unit 110 and the drive unit 111 is arranged to vary the output power of the lubrication pump 106 at least partly on the basis of the temperature indication signal.

The physical implementation and accurate location of the temperature sensor 113 are not of primary importance to the present invention, as long as the temperature sensor is capable of measuring a temperature that has a sufficiently unambiguous relationship to the temperature-induced characteristics of the lubrication fluid pumped by the lubrication pump. One or more temperature sensors can be used. If there are more the one temperature sensor, deriving the temperature indication signal from their outputs may include calculations such as taking a mean value or difference, or other kinds of processing.

According to an embodiment of the invention the controller is configured to accept lower pressure indication signals for colder lubrication fluids. If the lubrication fluid is very cold, such as at startup in winter conditions, it has also a relatively high viscosity. This in turn leads to larger flow resistance in any channel through which the lubrication fluid should flow. The larger the flow resistance of a fluid, the more pumping power it takes at an input of a channel to obtain a predetermined pressure reading at the output of said channel. Not limiting the pumping power at very cold conditions might lead to a situation where the controller tries unnecessarily to increase the output power of the lubrication pump beyond reasonable limits, simply because the cold and tacky lubrication fluid loses so much of its pressure on its way towards the pressure sensor simply because of flow resistance.

In the method representation of FIG. 3, selecting the target pressure for the lubrication fluid can be incorporated in steps 301 and 303. For example, as a response to a temperature indication signal indicative of the lubrication fluid being colder than a predetermined threshold, a second target pressure is selected for the lubrication fluid. The second target pressure is lower than a first target pressure that is selected for the lubrication fluid at temperatures that are higher than said predetermined threshold.

The appropriate relationship between measured temperature and desired pressure of the lubrication fluid can be found through experiments. One alternative is to use the temperature indication signal as an on/off command to the pressure-based determination of the output power of the lubrication pump. In other words, the controller would vary the output power of the lubrication pump on the basis of the pressure indication signal only if reading the temperature indication signal indicates that the temperature of the lubrication fluid is within some limits, between which it has been found that the pressure-based control produces appropriate results. Yet another alternative is to equip the controller with two or more mutually alternative pressure-based control algorithms, and to use the temperature indication signal to select the pressure-based control algorithm that is the most suitable for temperatures indicated by the temperature indication signal.

The pressure (and possibly temperature) indications signals may convey important first-hand information about what is going on in the gear unit and its lubrication. It is typical to wind turbines that a remote monitoring location exists where the condition and operation of a number of wind turbines is monitored. The gear lubrication arrangement of FIG. 1 comprises a signalling output 114 for transmitting information to such a remote monitoring location. The signalling output can be used for signalling many kinds of information, especially in embodiments where the control unit 110 is responsible for also other kinds of control functions than just the pressure feedback. As an embodiment of the present invention the controller may be configured to send to the signalling output 114 information indicative of which output power it has selected for the lubrication pump 106. In addition or as an alternative it may be configured to send to the signalling output 114 information indicative of the pressure and/or temperature indication signals that it has received from the sensors 112 and 113.

The connection represented in FIG. 1 as the signalling output 114 can be also bidirectional, so that some other device (like the remore monitoring location) can download to the controller e.g. new algorithms and/or new target values or limiting values of the pressure of the lubrication fluid.

The specific examples provided in the description given above should not be construed as limiting. Therefore, the invention is not limited merely to the embodiments described above.

The invention claimed is:

1. A gear lubrication arrangement for providing lubrication to a gear of a wind turbine, comprising:
    a lubrication pump for circulating lubrication fluid in the gear of the wind turbine,
    a power source coupled to the lubrication pump for driving the lubrication pump, and
    a controller coupled to at least one of the lubrication pump and the power source, for controlling an output power of the lubrication pump,
wherein:
    the gear lubrication arrangement comprises a pressure sensor disposed downstream of the lubrication pump in respect of lubrication fluid pumped by the lubrication pump,
    the pressure sensor is configured to measure a pressure of the lubrication fluid and to produce a pressure indication signal representative thereof,
    the gear lubrication arrangement comprises a temperature sensor configured to measure an actual temperature of the lubrication fluid and to produce a temperature indication signal representative of the actual temperature of the lubrication fluid, and
    the controller is arranged to vary the output power of the lubrication pump at least partly on the basis of the pressure indication signal and at least partly on the basis of the temperature indication signal so that the output power of the lubrication pump is limited in response to a situation in which the temperature indication signal indicates temperature below a predetermined limit.

2. The gear lubrication arrangement according to claim 1, wherein the controller is arranged to vary the output power of the lubrication pump to drive the measured pressure of the lubrication fluid towards a target pressure.

3. The gear lubrication arrangement according to claim 2, wherein the controller comprises a proportional and integrative regulator, and a difference between the pressure indication signal and a target value of the pressure indication signal represents an input quantity of the proportional and integrative regulator.

4. The gear lubrication arrangement according claim 3, wherein the controller is arranged to compensate for changes in the measured pressure of the lubrication fluid, by increasing the output power of the lubrication pump as a response to the measured pressure being lower than a first predetermined value, and by decreasing the output power of the lubrication pump as a response to the measured pressure being higher than a second predetermined value.

5. The gear lubrication arrangement according to claim 3, wherein the controller is arranged to select the output power of the lubrication pump from a set of at least three discrete values.

6. The gear lubrication arrangement according claim 2, wherein the controller is arranged to compensate for changes in the measured pressure of the lubrication fluid, by increasing the output power of the lubrication pump as a response to the measured pressure being lower than a first predetermined value, and by decreasing the output power of the lubrication pump as a response to the measured pressure being higher than a second predetermined value.

7. The gear lubrication arrangement according to claim 2, wherein the controller is arranged to select the output power of the lubrication pump from a set of at least three discrete values.

8. The gear lubrication arrangement according to claim 1, wherein the controller is arranged to compensate for changes in the measured pressure of the lubrication fluid, by increasing the output power of the lubrication pump as a response to the measured pressure being lower than a first predetermined value, and by decreasing the output power of the lubrication pump as a response to the measured pressure being higher than a second predetermined value.

9. The gear lubrication arrangement according to claim 8, wherein the controller is arranged to select the output power of the lubrication pump from a set of at least three discrete values.

10. The gear lubrication arrangement according to claim 1, wherein the controller is arranged to select the output power of the lubrication pump from a set of at least three discrete values.

11. The gear lubrication arrangement according to claim 1, wherein the controller is arranged to vary the output power of the lubrication pump continuously.

12. The gear lubrication arrangement according to claim 1, wherein:
the gear lubrication arrangement comprises a signalling output for transmitting information to a remote monitoring location, and
the controller is configured to send to said signalling output information indicative of which output power it has selected for the lubrication pump.

13. The gear lubrication arrangement according to claim 1, wherein:
the power source is an electric motor, and
the controller comprises a frequency converter coupled to deliver a driving electric signal to said electric motor.

14. A gear unit of a wind turbine, comprising:
a first shaft and a second shaft for connecting to an external mechanical system,
at least one gear stage located between the first and second shafts,
bearings supporting said first and second shafts, and
a gear lubrication arrangement for providing lubrication to said gear stage and said bearings;
wherein:
the gear lubrication arrangement comprises a lubrication pump configured to circulate lubrication fluid in the gear of the wind turbine, a power source coupled to the lubrication pump and configured to drive the lubrication pump, and a controller coupled to at least one of the lubrication pump and the power source, and configured to control an output power of the lubrication pump,
the gear lubrication arrangement comprises a pressure sensor disposed downstream of the lubrication pump in respect of the lubrication fluid pumped by the lubrication pump,
the pressure sensor is configured to measure a pressure of the lubrication fluid and to produce a pressure indication signal representative thereof,
the gear lubrication arrangement comprises a temperature sensor configured to measure an actual temperature of the lubrication fluid and to produce a temperature indication signal representative of the actual temperature of the lubrication fluid, and
the controller is arranged to vary the output power of the lubrication pump at least partly on the basis of the pressure indication signal and at least partly on the basis of the temperature indication signal so that the output power of the lubrication pump is limited in response to a situation in which the temperature indication signal indicates temperature below a predetermined limit.

15. A method for providing lubrication to a gear of a wind turbine, comprising:
circulating lubrication fluid to the gear with a selected pumping power,
measuring a pressure of the lubrication fluid downstream of a lubrication pump that produces said pumping power,
measuring an actual temperature of the lubrication fluid and producing a temperature indication signal representative of the actual temperature of the lubrication fluid, and
varying the selected pumping power at least partly on the basis of the pressure indication signal and at least partly on the basis of the measured actual temperature of the lubrication fluid so that the pumping power is limited when the temperature indication signal indicates temperature below a predetermined limit.

16. The method according to claim 15, comprising:
driving the measured pressure of the lubrication fluid towards a target pressure by varying the selected pumping power.

17. The method according to claim 16, comprising:
as a response to the temperature indication signal indicative of the lubrication fluid being colder than a predetermined threshold, selecting a second target pressure for the lubrication fluid that is lower than a first target pressure that is selected for the lubrication fluid at temperatures that are higher than said predetermined threshold.

18. The method according to claim 15, comprising:
sending to a remote monitoring location information indicative of which pumping power has been selected.

* * * * *